United States Patent [19]

Schubert et al.

[11] 4,456,449

[45] Jun. 26, 1984

[54] APPARATUS FOR THE PRODUCTION OF CALCIUM SILICATE-CONTAINING STONE BLANKS USEFUL IN CONSTRUCTING BUILDING WALLS

[75] Inventors: Peter Schubert; Hermann Pfeifer, both of Aachen; Volker Hermann, Bad Schwalbach; Reimund Keller, Hattingen; Eckhard Schulz, Wallenhorst, all of Fed. Rep. of Germany

[73] Assignee: SICOWA Verfahrenstechnik für Baustoffe GmbH & Co. KG, Aachen, Fed. Rep. of Germany

[21] Appl. No.: 450,084

[22] Filed: Dec. 15, 1982

Related U.S. Application Data

[62] Division of Ser. No. 256,614, Apr. 22, 1981, Pat. No. 4,376,086.

[30] Foreign Application Priority Data

Apr. 22, 1980 [DE] Fed. Rep. of Germany ....... 3015432

[51] Int. Cl.³ .......................... B28B 5/00; B28B 13/00
[52] U.S. Cl. ...................................... 425/253; 425/414
[58] Field of Search .......................... 425/93, 253, 414

[56] References Cited

U.S. PATENT DOCUMENTS

| 986,701 | 3/1911 | Frerichs | 425/414 |
| 1,970,245 | 8/1934 | Morse | 425/253 |
| 2,003,702 | 6/1935 | Straub | 425/253 |

Primary Examiner—Donald E. Czaja
Assistant Examiner—W. Thompson
Attorney, Agent, or Firm—Watson, Cole, Grindle & Watson

[57] ABSTRACT

An apparatus for the production of calcium silicate based stone blanks including at least one mold into which a crude mixture is poured, the mixture comprising granulated silicate-containing material, lime, water, a cement and foam. The mold has a cover, a bottom and side plate, with one of the plates being movable to open and close the mold. The crude mixture is heated in the mold essentially uniformly to a temperature between 45° C. and 90° C. until achieving the desired blank-strength by strength-forming reactions of the cement in the crude mixture. The heater used for this purpose is a high frequency voltage heater using two parts of the mold as condensor plates connectable with a high frequency voltage source. The formed stone blanks are thereafter removed from the mold and transferred to a transport station.

6 Claims, 12 Drawing Figures

APPARATUS FOR THE PRODUCTION OF CALCIUM SILICATE-CONTAINING STONE BLANKS USEFUL IN CONSTRUCTING BUILDING WALLS

This is a divisional, of application Ser. No. 256,614 filed Apr. 22, 1981, now U.S. Pat. No. 4,376,086.

BACKGROUND OF THE INVENTION

The present invention relates to an apparatus for the production of calcium silicate stone blocks, especially the production stone blocks useful in construction building walls.

Calcium silicate stones having densified structures, e.g., sandy limestones, are customarily produced by preparing a mixture of quartz sand, lime and water, the lime thereafter becoming slaked with the water, thereby producing a crude mixture having an essentially dry, almost dusty to slightly soil-moist consistency. Such a crude mixture, when subjected to high pressure on the order of magnitude of more than 15 m.kg/sec$^2$/MM$^2$, can be compacted in a compacting apparatus to form stone blanks. As a result of this compacting, physical bonding forces arise in the stone blanks which, because of the high pressure, are sufficient to allow the blanks to be removed from the mold without damage and thereafter to be transported to an autoclave in which steam curing will take place. The steam curing will result in the development of chemical bonding forces, i.e., due to the formation of calcium silicate hydroxide bridges. However, the use of such high pressures for the production of the stone blanks is disadvantageous, not only because of the apparatus which is required but because the produced stone blanks will have a high fragment bulk density and a low heat damping capacity. In addition, the high fragment bulk density means that the stone blanks cannot be made too large since they will be too heavy for the bricklayers to handle during bricklaying.

According to U.S. Pat. No. 4,229,393, the fragment bulk density of stone blanks can be reduced and the heat damping characteristics increased if cement in a quantity of at least 1% by weight, as well as foam or pore formers, are added to the customary crude mixture of sandy limestone and subsequent compaction pressures of significantly lower than 15 m.kg/sec$^2$/mm$^2$ are used. The addition of cement provides chemical binding forces which partially replaces the physical bonding forces needed to achieve a sufficient strength in the stone blanks since strength-building reactions of the cement are allowed to start prior to the molding of the stone blank. In addition, the fragment bulk density will be considerably reduced by use of a reduced compacting pressure and it is then possible to add lightweight aggregates which further improve the heat damping characteristics of the stone blanks. Stones are produced which have a pattern of holes, a high number of the holes being separated from one another by bridges. These bridges provide a favorable effect on the heat damping characteristics of the stone blanks and moreover will considerably reduce the total weight of the blanks. The strengths of the bridges, however, may not be reduced to the lowest desireable level because to achieve such desired low bridge strengths the bridges must be developed perfectly during formation of the blank. Moreover, the process is difficult to accomplish whenever an intermediate storage of the crude mixture is required prior to the commencement of the strength-creating reactions of the cement. Moreover, the processing of the crude mixture is problematic per se whenever intermediate storage is necessary, and this is especially so with breakdowns in the subsequently utilized elements of the apparatus.

SUMMARY OF THE INVENTION

It is an object of the present invention to provide a process and an apparatus of the initially described type which will be simpled yet will result in optimal heat-damping characteristics in the produced calcium silicate stones, make possible the production of calcium silicate stones with especially low fragment density while displaying an optimum hole pattern.

According to the invention the raw mixture used has a suitable pouring consistency, i.e., it has no spreading dimension that can be measured (>K3 according to DIN 1045), and it is essentially automatically levelling (it will retain no natural embankment angle when poured). The crude mixture will have cavities which are essentially formed only by the added foam. Viewed without the added foam, the cavities between the individual particles of the crude mixture are practically completely filled with water, so that the exertion of a pressure, as in the case of conventional sandy limestone production into stone blanks, would not lead to an increase of physical bonding forces and to a blank capable of easy handling. The pouring consistency makes possible an easy and simple adding and filling of the mold with the required volume of crude mixture by pouring in, etc., whereby the crude mixture essentially and without difficulty fills the mold.

In addition, this pourable consistency makes it possible to further reduce the bridges between the holes in the stones as far as their width is concerned, so that the number of holes and the total portion of holes in the case of an optimum hole pattern with regard to heat damping may be increased, without any mechanical problems occurring due to the development of holes affecting the strength of the blank.

Furthermore, the present process is suitable for producing solid stones with low bulk density as well as stones with holes and solid stones with integrated heat damping, so that by the latter is made possible the filling of a hole extending essentially over the width and length of the stone with a heat damping material, such as for example a polystyrene block which is inserted into this hole. The stone blanks obtain sufficient strength to facilitate removal from the mold and succeeding transportation by the heat treatment that is to be carried out during molding, which leads not only to short cycle times during production of the blanks, and in the case of stones with holes makes possible the development of bridges with the desired low strength of the wall and nevertheless with the required strength in the blank, but which generally permits an economically acceptable processing of a crude mixture with a pourable consistency without pressure or essentially without pressure, and especially without the need for an intermediate storage of the crude mixture prior to molding. The tarry time in the mold and thus the cycle time will drop with the increase of the heating temperature for the rew mixture and/or of the portion of cement. Because of the practically pressureless production of the blanks, the addition of foam to the crude mixture is particularly effective since the foam-pores are practically not crushed during the production of the blank and thus contribute fully to the lowering of the fragment bulk density of the stone and thus also to the increase of the heat damping characteristics. It is to be noted that the pores which have been predetermined by the foam remaining intact, although the foam per se in the case of the heating temperatures provided for the crude mixture in the mold, still only has a low stability in the event the latter is still extant at all in the case of the temperatures used.

This process has nothing to do with the production of aerated cements, known per se, where the pores are produced by the development of gas in a crude mixture already located in the mold, whereby the aerated cement remains for two hours and more in the mold, an imprecisely determinable expansion occurs which requires a succeeding cutting up of the aerated cement into blocks of desired size which then possibly even have to be ground. In the case of the production of aerated cement, the shaping is connected with the bonding process and only sands with a fine grading curve which must have a very small grain size may be used. As compared to that, in the case of the process according to the present invention, the true measurement of the stones produced is assured by the shaping which is independent of the chemical reactions taking place which essentially differ from the manner in which such occur during the production of aerated cement, so that no reprocessing of any kind is needed and, moreover, even sands with coarse grain parts of other silicate-containing materials may be used.

As compared to the hitherto known production of sandy limestone, the present invention permits the use of slaked lime, calcium hydroxide, etc., as a starting material instead of quick lime. The temperature problems are thus essentially reduced which may otherwise occur as a result of the heat developing during the slacking of the lime. Moreover, the addition of water may be accomplished more easily, since the moisture in the sand may be well determined. On the other hand, it may not be easily determined in the just slaked lime because of the crystal water available which is also measured during the determination of the water content. In the case of the conventional production of sandy limestone, the use of slaked lime, such as hydrated lime, etc., is not possible on the contrary, because of the normally present and usually even fluctuating water content of the sand, since as a result of that so much moisture is fed to the crude mixture that it would not be possible any longer to unmold blanks.

Instead of the customarily used quartz sand, other silicate-containing material may be used, for example, pumice, alumina or fly ash, etc., which may replace the quartz sand wholly or partially and possibly may also in addition contribute to a decrease in the weight of the finished stone.

As a cement, a Portland cement may be used, for example, in combination with a certain quantity of hardening accelerators and possible delaying agents, but also, for example, a quick-setting cement with a correspondingly adjusted beginning of the hardening time may be used. As a setting accelerator, for example, alkaline aluminates, such as sodium aluminate, sodium carbonate, sodium silicate; chlorine containing aluminates such as aluminum and calcium chloride as well as water soluble aluminates and silicates may be used, and as delaying agents, sulfates and sugar derivatives may be used.

Lightweight additives in the form of cork or powdered wood, polystyrene pellets, etc., may be added to the crude mixture. It is also possible to use liquefiers known per se which additionally liquefy the crude mixture.

The crude mixture may be dosed both volumetrically as well as gravimetrically into the molds although the former is preferred for simply and quickly producing stones with essentially constant weight. Possible fluctuations of the bulk density of the crude mixture are balanced out by weighing the volumetrically dosed quantity and subsequently regulating the density of the crude mixture for the following charge corresponding to the measurement value obtained thereby. This is accomplished by corresponding dimensioning of the water or foam quantity in the crude mixture.

It will be effective to excessively fill the molds with the crude mixture and to then compress the crude mixture with a slight pressure to the determined volume, so that even in the case of a fluctuation of the bulk density, the crude mixture will be measured at greater values than the mold when completely filled by the dosed quantity of crude mixture. In this case, a small part of the foam pores is crushed, but the foam part of the crude mixture may be adjusted previously at a correspondingly higher value in order to take this into consideration. Also the excess filling facilitates the development of sharp-edged stones since a quicker and better filling of the mold especially in the area of the bridges is achieved, whenever the crude mixture must rise between the mandrels in order to fill the mold. The degree of excess filling depends on the side of the stone and on its proportion of holes and may amount to up to 20% by volume or more. On the other hand, for solid stones, a very slight excess filling will suffice.

For forming the holes, molds may be used which have correspondingly developed spikes, although it is preferred to develop the holes by moving spikes into the partly filled mold, especially from above through the cover plate of the mold, as a result of which the mold is then filled with the crude mixture. For a mold, which is closed on all sides and is excessively filled relative to its stone volume, the shaped blank is assured of having a sharp edge, while the pourable consistency of the crude mixture makes possible the rising of same between the spikes and thus the development of the holes with only a very slight load on the spikes which are to be moved in. And, the holes are developed preferably as blind holes.

The heating is accomplished generally during a period of time of about 15 seconds to 1 minute., preferably 0.5 min. to 1 min., in heating by contact heat, and 10 to 20 seconds in heating by means of a high frequency field, and a hardening of the cement (but essentially not of the calcium hydroxide by the developing of calcium silicate hydroxide bridges) in such a degree that the required strength of the blanks of greater than 0.1 m.kg/sec$^2$/mm$^2$ is reached in this period, despite the pouring consistency of the crude mixture, whereby a surface, as hard as leather, of the stone blank results without a surface area completely poor in fluid, so that no crumbling away takes place. The cycle times achieved in such manner are industrially acceptable and avoid a complex intermediate storage which is problematic in regard to the temporal course of the process.

The foam is added either as such to the crude mixture or developed in it prior to filling it into the mold by addition of a foam maker, although the former is preferred. Bulk densities of foam of about 50 to 100 g/l, especially of about 70 to 80 g/l, are preferred. Rather than air, the foam may also be filled with $CO_2$ as a result of which, in case of an excess filling of the mold, and a successive crushing of the overdosed foam and/or in the case of crumbling of the foam under the action of heat, $CO_2$ becomes free, which leads to additional strength forming reactions as in the case of non-hydraulic lime. By adjusting the foam quantity and possible the other components of the crude mixture, the latter is preferably adjusted so as to achieve a fragment bulk density of the stone which is greater than 1600 $kg/m^3$ for a porous stone, whereby fragment bulk densities below 1200 $kg/m^3$ may be easily achieved, and densities greater than 900 $kg/m^3$ result for a solid stone.

Since foams often are temperature sensitive, it will be effective to maintain the temperature of the crude mixture so low up to the time it is filled into the mold, that the stability of the foam will practically not be affected by the temperature. The use of slaked lime presents no problem, since the crude mixture has a temperature which is composed of the temperature of the straring materials which essentially are only subject to seasonal fluctuations. If however, the slaking heat of unslaked lime, which is used as a starting material, is added, then a cooling, such as by a corresponding reduction of heat, etc., must be accomplished. Thus synthetic foams have sufficient stability essentially only below 30° C., while protein foams have a sufficient stability even above 30° to 40° C. and possibly above such range. Depending on the foam used and the temperature of the materials used as well as the type of installation employed, it will be possible therefore to maintain the temperature of the mixture of silicate-containing material, lime and water, constant, and thus the addition of cement, accelerator and delaying agent as well as of foam, constant or in correspondence with the starting temperature of the mixture of silicate-containing material, lime and water, to dose the quantity, of foam, and/or the quantity of delaying agent and/or the accelerator for the cement.

At the same time the cement is to be adjusted such that, depending on the start of strength-forming reactions by the corresponding addition of accelerators and delaying agents depending upon the temperature of the crude mixture, the reaction will be triggered only by the action of heat in the mold. It may therefore also be necessary to correspondingly discharge heat originating from the slaking of the lime. Therefore, it will be effective to add the type and quantity of foam and a retarder, corresponding to the temperature of the mixture of silicate-containing material, lime and water in a regulated manner.

In order to facilitate the removal of the molded blank from the mold and to avoid a baking-on, it will be preferable to wet the mold and the spikes, prior to the pouring in of the crude mixture, with a separator known per se. This may be accomplished by spraying or immersion, whereby in the latter case it will be effective to use a separator bath energized by means of ultrasonics, in order to thereby remove remnants of the crude mixture from the mold and the spikes.

The heating of the crude mixture by means of an electric field is suitable for both solid as well as porous stones and may be supplemented by heating the mold itself, while the use of heatable molds and heatable spikes (contact heat) is suitable only for porous stones. For the heating of the crude mixture in the mold by means of a high frequency field, frequencies greater than 600 kHz with voltages greater than 5 kV may be used, whereby frequencies up to 30 MHz may be used.

The filling arrangement may be a device which facilitates a poiuring in of the crude mixture into the mold, since the crude mixture has a pourable consistency. It may at the same time facilitate a dosing of the crude mixture.

In such a device, spikes may be disposed in the desired dimensions in the hole-pattern provided and may be moved in altogether into a mold filled with crude mixture and preferably from above but only up to a certain distance above the bottom of the mold for the development of blind holes. At the same time the mold may have a cover plate for closing same, which may be moved into a closing position, which has corresponding holes for insertion of the spikes and is disposed with the spikes possibly on a support for the spikes lowered to a predetermined level.

The device however, may also have a bottom that may be moved upwardly toward a cover plate, which is stationary during the shaping, whereby the spikes may possibly be fixedly disposed on the bottom and may be moved up with it. The bottom however, may also include an endless, revolving conveyor belt, such as a steel belt, which for example, may be driven intermittently at regular intervals.

The free ends of the spikes may be tapered, with conical or rounded tips, to facilitate their removal from the mold. Also, each spike at its free end may have an aerating aperture, in order to prevent the development of a vacuum in this area during extraction of the spikes from the molded blank, since this could lead to a crumbling of the bridges.

The bridges may be heated preferably with an electric heating device (heating cartridges), whereby the heating intensity is variable over the length of the spikes continuously and by sections (for example, in three steps), so that a temperature gradient is developed, adapted to the heat requirement of the crude mixture, developing during insertion of the spikes into the filled-in crude mixture, so as to achieve a uniform as possible heating of the mass of the blank. Since the heat requirement, viewed over the cross section of the molded blank is likewise not uniform, because of the walls of the mold, heated by contact heating plates, the heating intensity of the spikes, distributed over the base surface, should be designed of variable intensity, in order to take into consideration the mass of one spike to be heated as well as the heat supply of other units, such as that of the mold.

The bottom plate, which is developed as a pallet or as a conveyor belt, etc, may be preheated, such as inductively or by infrared radiation.

If a separating bath is used for the spikes, the mutual distance between the mold disposed essentially on the same level, and the bath may be equal to the mutual distance between a filling arrangement for the mold and the spikes disposed as a perforation arrangement, so that the bath, disposed on a joint moveable support with the mold, is moved beneath the spikes of the perforating device, whenever the mold moves toward the filling arrangement.

The cover plate is first held in its position during removal from the mold, until the lateral walls of the mold and the spikes are lifted at least partly from the blank, in order to make possible in this way a removal free of problems from the mold.

Whenever a conveyor belt is used as the bottom plate of the mold, it will be possible to remove the blanks even if they have not yet reached the strength desired for gripping and stacking them, after which they are guided by means of a conveyor belt through a reheating arrangement, for example, a heating tunnel or an infrared heater, where an additional strengthening to the desired strength of the blank for gripping and stacking takes place as a result of the heating acting there. Such is possible, since the blanks need only be ready for handling at the end of the conveyor belt, since they will be seized there in order to be conveyed to an autoclave in stacked form.

The invention will be described subsequently in more detail when taken in conjunction with the accompanying drawings.

DETAILED DESCRIPTION OF THE INVENTION

Figure 1:
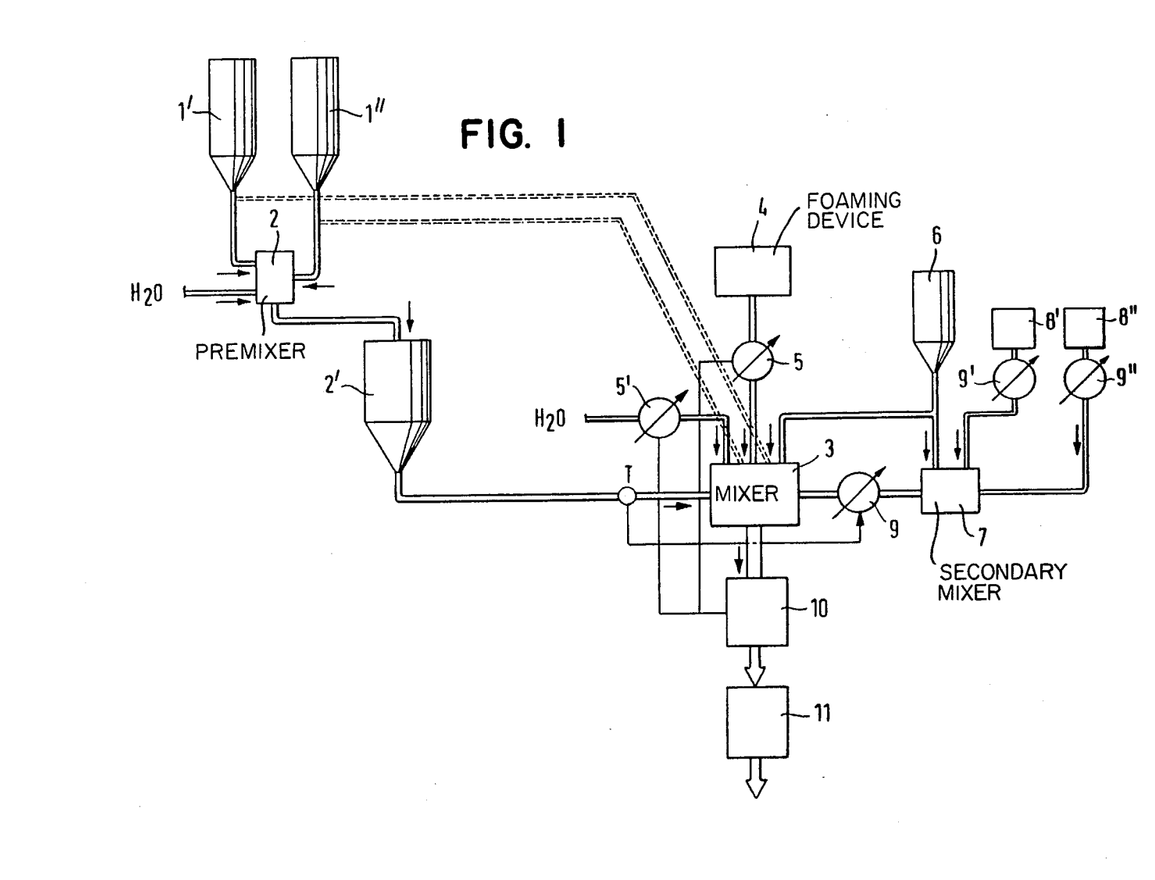
FIG. 1 schematically illustrates the process steps carried out in accordance with two embodiments of the invention.
Figure 2A:
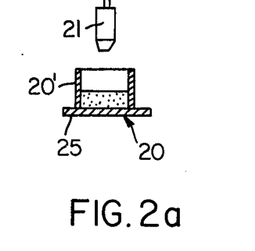
FIG. 2 schematically illustrates a step-by-step production of a blank by shaping and heating.
Figure 2B:
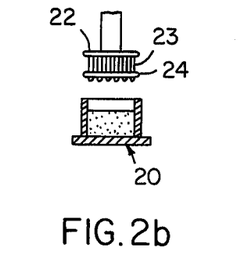
Figure 2C:
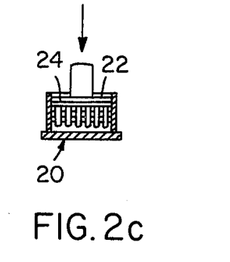
Figure 2D:
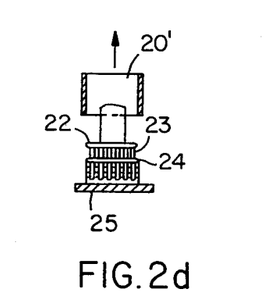
Figure 2E:
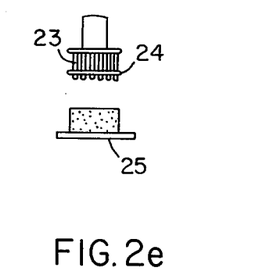
Figure 2F:
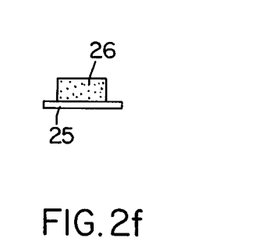
Figures 2G, 2H:
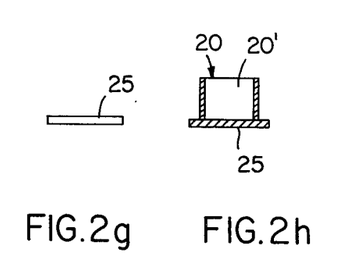
Figure 2I:
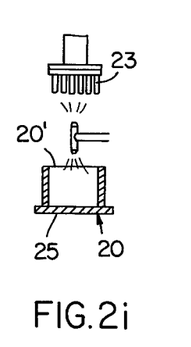

According to a first embodiment of the process as shown in FIG. 1, quartz sand contained in a silo 1', and ground quick lime contained in a silo 1'', are fed to a pre-mixer 2, to which water is added at the same time in sufficient quantity. The mixture is allowed to react in a reactor 2' for a sufficient length of time in order to slake the lime. The slaked lime and sand mixture is then fed to a mixer 3, into which water is also fed, in order to achieve a sufficiently fluid consistency of the final crude mixture. Thus the temperature of the mixture of slaked lime and sand, still possibly relatively warm from slaking, is reduced at the same time by (according to the season) values fluctuating, for example, by about 20° C. Furthermore, a foam-producing device 4, such as a foam gun, is provided, from which produced foam is added likewise to the mixer 3, via a regulating means 5 in a controlled manner. Cement is fed from a supply container 6 directly to the mixer 3 and into a secondary mixer 7, to which moreover a hardening accelerator is added fomr a container 8' and a hardening retarder from a container 8''. This cement component together with the accelerator and the retarder are at first premixed in the secondary mixer 7 prior to a better, later thorough mixing in the mixer 3. The addition of accelerator and retarder takes place via regulating means 9' and 9''.

The mixture produced in the secondary mixer 7 is then fed to mixer 3 via a regulating means 9. The regulation of the regulating means 9, 9' and 9'' takes place corresponding to a temperature T, which has the mixture reaching the mixer 3, in order to adjust the recipe of cement, accelerator and retarder to the pertinent conditions. For example, after a mixing time of 1 minute., the finished crude mixture reaches an apparatus 10 from mixer 3, for the production of the blanks by molding and heating. In this case, the adding may be accomplished volumetrically, after which the weight of the volumetrically determined volume of crude mixture is determined and is used for regulating the water and foam volume for the following charge via the regulators 5 and 5', in order to produce a crude mixture with the most constant possible bulk density. After removal from the mold, the blanks are stacked on hardening trucks and are moved to an autoclave 11, where they are subjected to a stream heardening, and they leave the autoclave as finished lime-silicate stones.

Whenever slaked lime is used instead of unslaked lime, the former is fed to mixer 3 from silo 1'' just like the sand, as shown in a broken outline in FIG. 1.

FIG. 2 shows the course of shaping a porous stone blank. First, a heated mold 20 (FIG. 2a) is filled by a filling device 21 with crude mixture of a certain volume, which is proportioned volumetrically. Then the mold 20 is disposed beneath downwardly moveable spikes 23 attached to a carrier plate 22 and disposed for the desired pattern of holes (FIG. 2b), whereby the free ends of the spikes 23 are located at about the level of openings in a cover plate 24 for mold 20. After that the spikes 23 are first moved downwardly with the cover plate 24, until the cover plate 24 reaches the intended final position corresponding to the height of the stone to be produced, after which the spikes are moved further downwardly through the openings in the cover plate 24 into the mold 20, until they are above the bottom plate 25 of mold 20 (FIG. 2C). The mold 20 is now closed and as a result of the displacement of the crude mixture, brought about by spikes 23, the entire mold 20 is now filled while developing sharp edges on the blank. In this moved-in condition of spikes 23 with a closed mold 20, heating of the crude mixture in mold 20 is carried out for example, for 0.5 to 1 min. at for example, about 80° C., whereby the temperatures of the individual spikes 23 and of the walls of mold 20 are controlled such that an as uniform as possible a temperature distribution over the blank results, which rises slowly during the initial period of the cycle to the final temperature. Such heating may be effected by a control heater 12 (FIG. 3) in contact with mold 20 and cover plate 24. A preheater 16 in contact with bottom plate 25 may be provided for preheating this plate in a preceding heating arrangement. And, the heating may be accomplished by applying a high frequency voltage to cover plate 24 and to bottom plate 25 (forming condensor plates) via leads 13 and 14, for a period of 10 to 20 seconds.

Obviously, with this type of shaping, the mold or a series of successing molds may be disposed on a track revolving cyclically or immovably and with filling devices and spikes positioned above the molds, or reciprocally movable in regard to the filling devices and the spikes. The time needed all together for one cycle is somewhat above the tarry time of the blank in mold 20.

Figure 3:
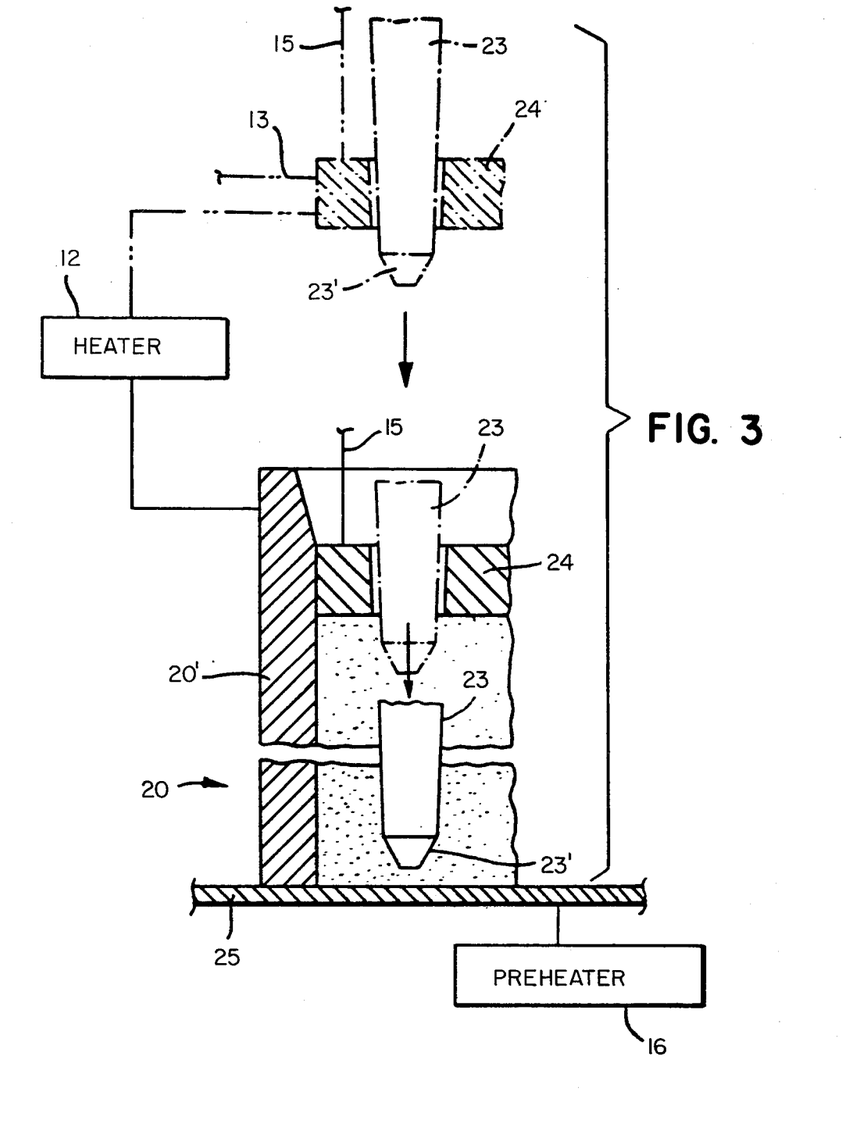
FIG. 3 is a sectional detail view of the molding-in of holes into the blank.

FIG. 3 shows in detail, and in steps, the insertion of a typical spike 23 which at first is located with its free end section 23' (developed tapering conically) at about the level of the cover plate 24 by means, for example, of flexible strands 15 extending between carrier plate 22 and cover plate 24. Of course, other suitable means may be provided. First the cover plate 24 with spikes 23 is moved downwardly until the intended height of the stone is reached, at which level its downward movement is stopped, while the spikes 23 tapering conically toward the free end 23' are moved farther into the mold 20, until they are at a short distance above the bottom plate 25. As a result of the slight conical development of spike 23 and of the lower end section 23' with a greater conical development, both the insertion and removal from the mold is facilitated. And, each of the spikes may have an aerating passage 17 formed therein and terminating in an aerating opening in the free end thereof. Such will serve to prevent the development of a vacuum at the tip ends of the spikes during removal from the molded blank.

Figure 4:
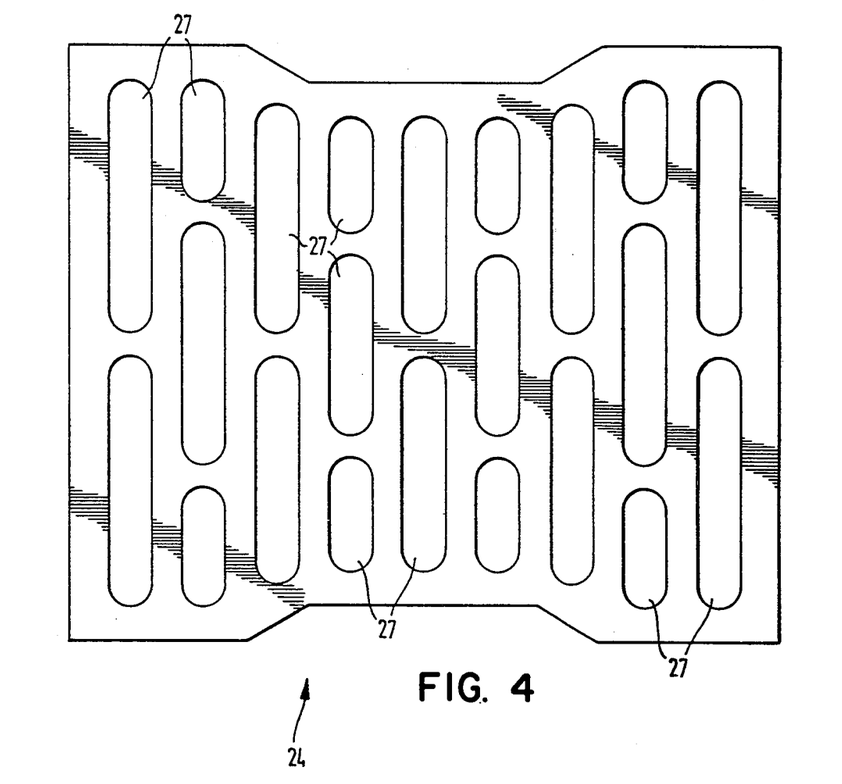
FIG. 4 is a top plan view of an embodiment of a cover plate for a mold for the production of a blank.

The cover plate 24 is shown in FIG. 4 for a predetermined pattern of holes and has a series of substantially parallel elongated apertures 27 separated by narrow bridges, into which corresponding spikes 23 may be moved, the spikes being are developed correspondingly plate-shaped (nevertheless conically in an axial direction), and which in the moved-in condition close the apertures 27. The mold of the cover plates 24 corresponds to the view of the top sides of the blanks 26 molded therewith.

Figure 5:
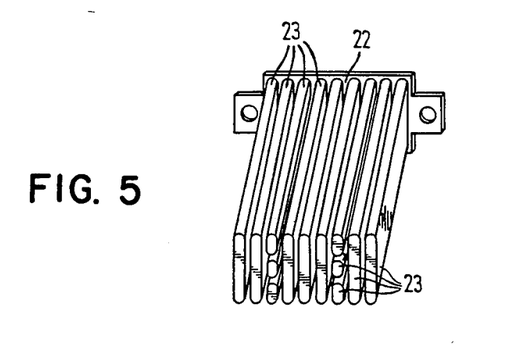
FIG. 5 is a perspective view of an arrangement of spikes for molding a predetermined pattern of holes into a blank.

FIG. 5 shows an arrangement of spikes 23 in perspective, which are attached to a carrier plate 22 for a different hole-pattern than that shown in FIG. 4. The conical development of the spikes 23 and of the end section 23' thereof have not been shown for reasons of simplification.

Figure 6:
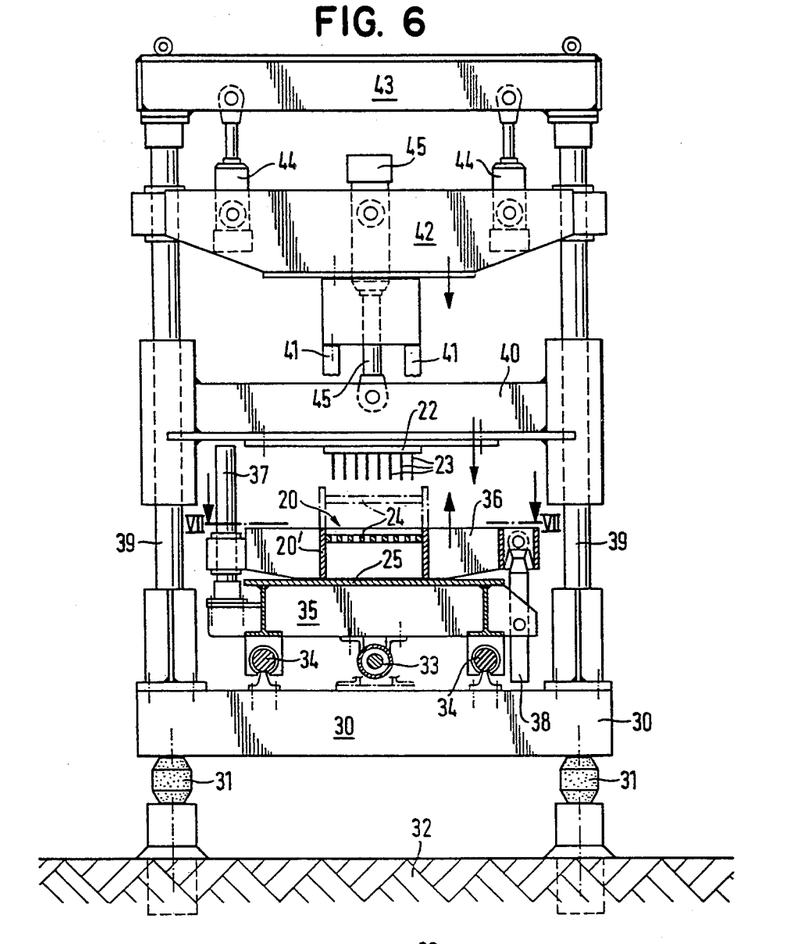
FIG. 6 is a front elevational view, partly in section, of an embodiment of an apparatus for the production of a blank.
Figure 7:
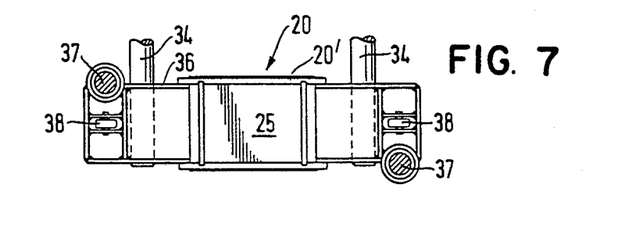
FIG. 7 is a partial top view taken substantially along line VII—VII of FIG. 6.
Figure 8:
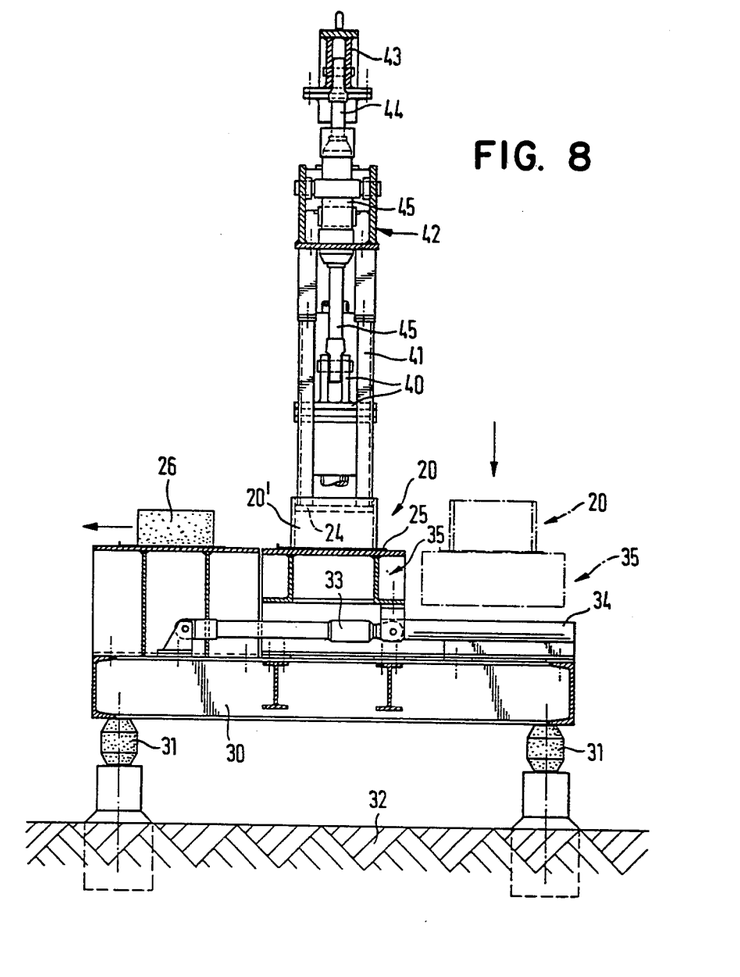
FIG. 8 is a side elevational view, partly in section, of the apparatus of FIG. 6.

The embodiment of the apparatus for the production of stone blanks, shown in FIGS. 6 to 8, has a basic frame 30 which is supported on the ground 32 via elastomeric buffers 31 such as rubber. A carriage 35 is disposed horizontally and is reciprocally movable along guides 34, in the embodiment shown, by means of a piston-cylinder unit 33. The carriage supports the bottom plate 25 of mold 20 as well as a mold box 20' forming the lateral walls of the mold 20. The mold box 20' is attached to a frame 36 (FIG. 7) is guided along vertical columns 37 disposed on the sides of the carriage 35, adjacent guides 34, and are movable up and down by means of piston-cylinder units 38.

Furthermore columns 39 extend vertically upwardly from the base frame 30 on which a crosshead 40 is guided and movable up and down by means of a suitable drive. The carrier plate 22, from which spikes 23 extend, is fastened to cross head 40. The spikes 23 may therefore be moved by means of the cross head phantom outline and solid outline positions of FIG. 3 respectively above and into the mold 20.

The cover plate 24 for the mold 20, which in FIG. 6 in its lower position is shown pulled through and inserted into the mold box 20', is attached to two bars 41 which are fastened to another cross head 42 which is disposed above cross head 40 and is likewise guided along the columns 39. At the upper ends of columns 39 there is a traverse element 43, from which two piston-cylinder units 44 extend downwardly to the cross head 42, so that the latter may be moved up and down. The cross head 40 is connected with cross head 42 so that spikes 23 and cover plate 24 may be moved jointly downwardly by operation of the piston-cylinder units 44, whereby the cover plate 24 reaches its terminal position at the end of the movement after which the piston-cylinder unit 45 is operated in order to move the spikes 23 into the mold 20. Corresponding stops (not shown) for the movement of cross heads 40 and 42 may be provided.

FIG. 8 moreover illustrates the manner of shifting the carriage 35, which first is in the filling position (the filling arrangement, however, has been omitted here), then moves into the shaping and heating position and from there moves the finished blank 26 into the removal position.

The heating system, such as heating cartridges for the spikes 23 and contact heating plates for mold 20, just like an arrangement for wetting of mold 20 and of the spikes 23 with a separating agent, have not been shown here in detail.

Figure 9:
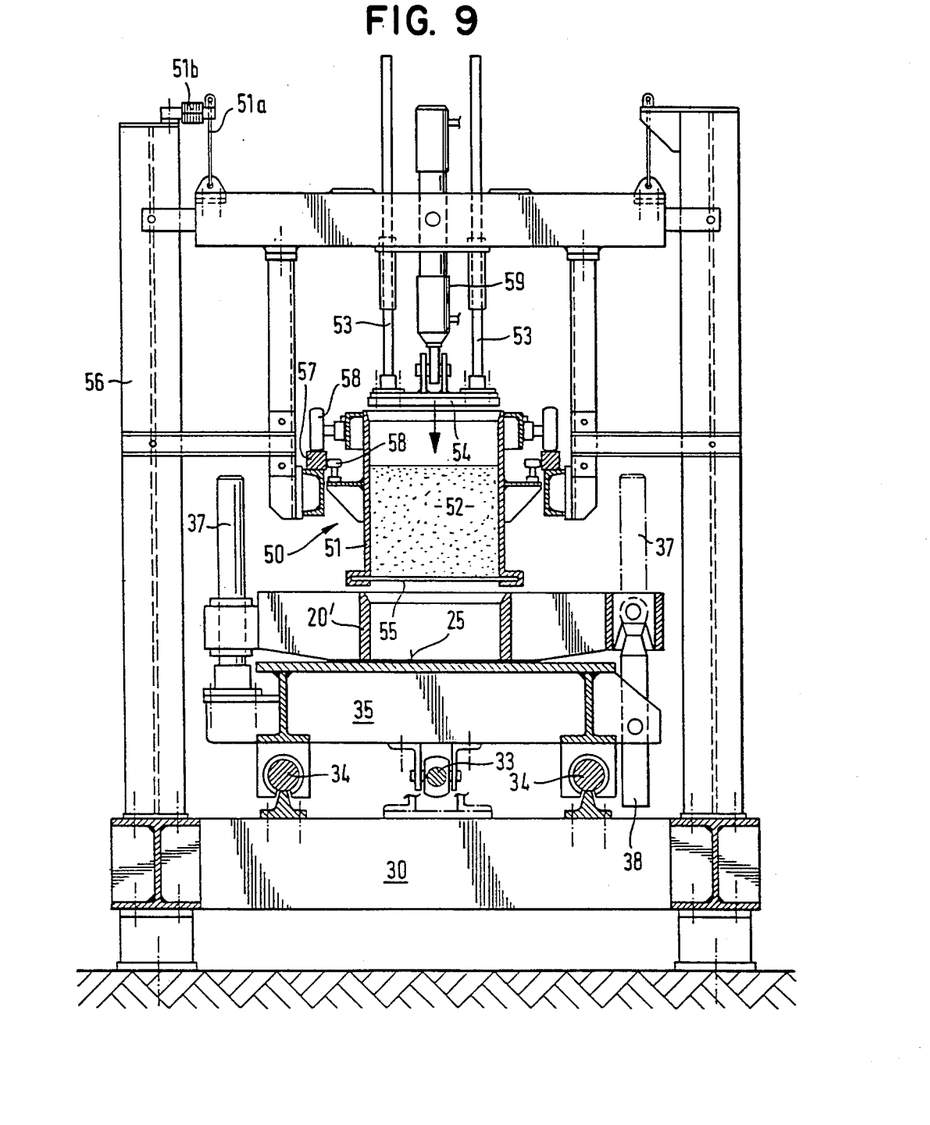
FIG. 9 is a front elevational view, partly in section, of a filling apparatus for the device of FIG. 6.
Figure 10:
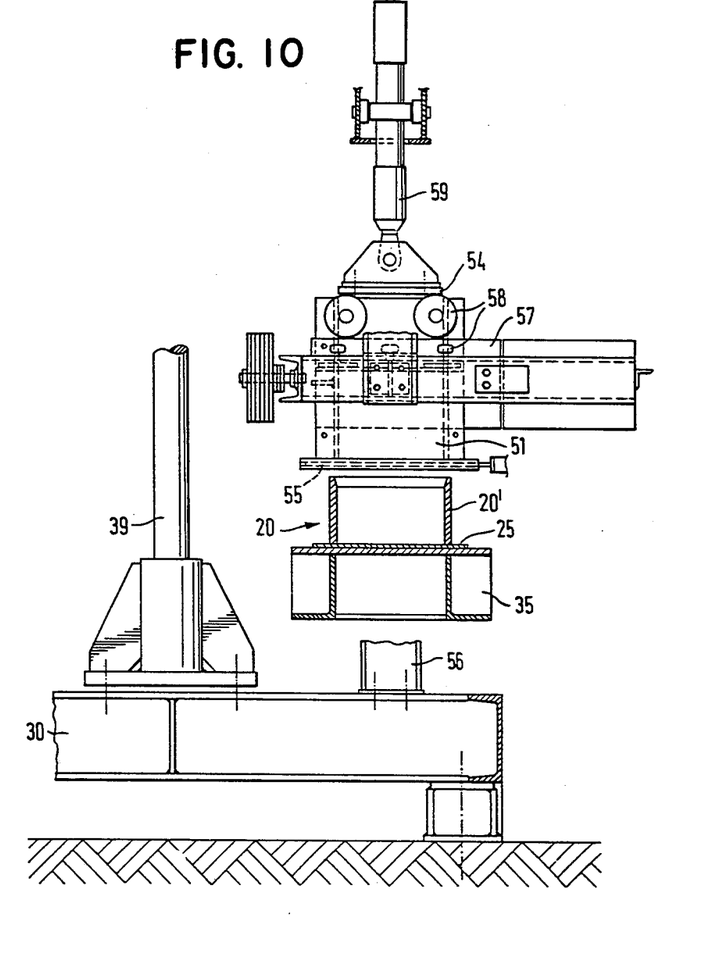
FIG. 10 is a side elevational view, partly in section, of the FIG. 9 filling apparatus.

FIGS. 9 and 10 show the filling station including a filler arrangement 50 comprising a pot-shaped container 51 which may be filled with crude mixture 52 from a mixer (not shown). While the dosing of the crude mixture into the container 51 is accomplished volumetrically, the container 51 with the pertinent parts suspended from ropes 51a is weighed, whereby a measuring cylinder for tensile force 51b delivers the corresponding measuring signal, so that the addition of water and/or foam to the crude mixture may be controlled via a control circuit in order to achieve a practically constant bulk density.

Above container 51 a piston 54, guided along two guide rods 53 is disposed which may be lowered from above into the container 51. The container 51 is closed on its underside by means of a slide 55, which may be opened for emptying the container 51 into the mold box 20', while the piston 54 for complete emptying and thus for cleaning of container 51 may be moved into the latter during or after the emptying process. A single or bipartite flap (not shown) could also be used instead of slide 55.

The container 51 is movable in a frame 56 between a filling station for the container 51 through a volumetrically operated dosing apparatus (not shown) which is connected to the mixer (not shown), and a filling station for the mold 20 via guides 57 disposed in frame 56, by which the container 51 is supported with running wheels 58, by a drive (not shown), while the piston 54 in the filling station for the mold 20, is suspended locally fixed in the frame 56, and may be moved up or down via a piston cylinder unit 59.

The molding of the blank in the mold 20 is accomplished essentially without pressure, for the slight force exerted perforce by the cover plate 24, limiting the tolerance of the blank, which also serves for the development of the sharp edge of the blank merely leads to a practically negligible pressure, which even in case of a possible excess filling of the mold is not followed by any kind of noticeable compacting of the blank, except of a corresponding crushing of pores in the form, as is also desired by the invention.

It should be noted that, upon removal of the spikes 23 from the blank 26 after heating, no collapse of the bridges are found to occur because of the development of a hardened surface, although the holes molded by the spikes 23 are dead-end holes, so that no air can enter from the opposite sides of these holes, and it could be expected that the bridges of the blank would collapse or at least could suffer considerable damage as the result of a developing vacuum. Nevertheless, the pore structure of the crude mixture in the blank is also preserved, although the foam is destroyed by the heating.

The spikes 23 can be developed mutually variably heatable by sections (for example, in three steps) or else continuously over their length, in order not only to achieve as uniform a heating as possible of the crude mixture 52 in mold 20, but ultimately to obtain stones or blanks with the greatest possible homogeneity, whereby otherwise by a control or regulation of the heating of the spikes 23 and of the mold 20 for the purpose of heating of the crude mixture 52 as opposed to a uniform heating of mold 20 and spikes 23 and thus of a generally uneven heating of the crude mixture 52, energy might still be saved. For this purpose, the spikes 23 are preferably generally not heated with the heat intensity, but spikes 23, located further out in the area of the mold box 20' may be heated with a different, as a rule lesser intensity in order to achieve a uniform heating of the crude mixture 52, then spikes 23 located farther inside.

Figure 11:
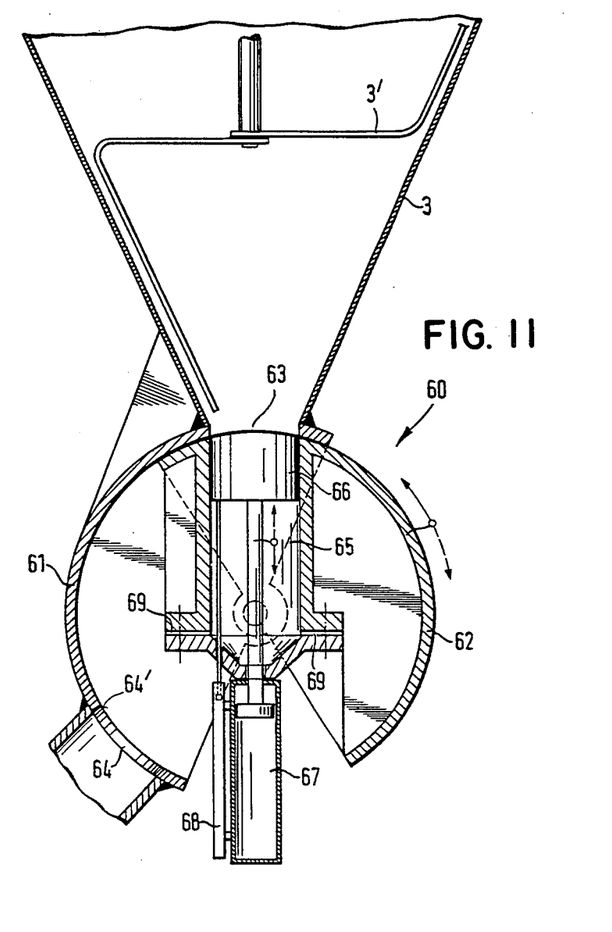
FIG. 11 is a schematic illustration of another embodiment of an apparatus for the production of blanks.

FIG. 11 shows a volumetric dosing device 60, which is disposed below the mixer 3, and which is equipped with a stirring mechanism 3' and a funnel-shapped mouth. The dosing device 60 comprises two semi-cylindrical parts 61, 62, whereby part 62—disposed coaxially with part 61-is notatable about an axle relative to the locally fixed part 61 and glides with its outer surface along the inner surface of part 61. The part 61 has an inlet opening 63 in the area of the funnel-shaped mouth of the mixer 3 and a discharge opening 64, which is directed obliquely downwardly. The part 62 has a chamber 65, open to the outside, in which an intake piston 66 is disposed for movement by means of a piston cylinder unit 67. For filling the chamber 65, its opening is aligned with the inlet opening 63 of part 61, while the intake piston 66 is in its outwardly moved position (FIG. 11) in which its outer surface is aligned with the outer surface of part 62. Then the intake piston 66 is moved inwardly a predetermined distance which is determined by a path guide 68. In such manner, the crude mixture is absorbed volumetrically into the chamber 65. Displaced air may exit via air discharge apertures 69, adjacent the inner end of the chamber. The path-guide 68 serves for adjusting the volume, corresponding to the size of the stone to be produced.

The part 62 is then rotated (counter-clockwise in FIG. 11) with a filled chamber 65 in relation to part 61, until the aperture of chamber 65 is aligned with the discharge opening 64 of part 61. The piston 66 is again moved outwardly and thus the chamber 65 is emptied. After that part 62 is rotated back for renewed filling of chamber 65, the edge 64' of the discharge opening 64 serves as a wiper blade for remnants of the crude mixture. The rotating of part 62 relative to part 61 may be carried out by means of a rotating cylinder (not shown).

The part 62 with filled chamber 65 may be weighed and the measurement value obtained thereby may be used for adjustment of the bulk density of the crude mixture.

Whenever there are several molds 20, a corresponding number of chambers 65 with pistons 66 and openings 63, 64 may be provided.

Figure 12:
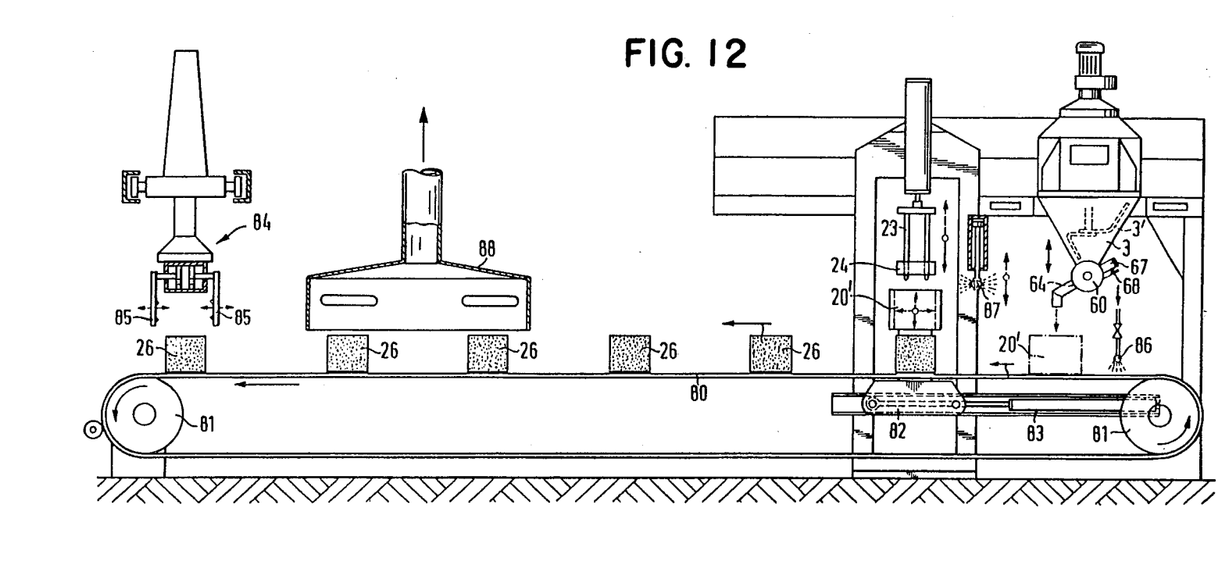
FIG. 12 illustrates a closing device for the apparatus of FIG. 11.

FIG. 12 schematically illustrates another embodiment of an apparatus for the production of blanks, and includes a conveyor belt 80, which may be in the form of a steel belt, guided aroung two reversing rolls 81, of which at least one is driven. The upper strand of the conveyor belt 80 may run over a steel plate (not shown) for support. The mold box 20' lies initially beneath the dosing mechanism 60, which is connected with the mixer 3. The mold box 20', filled with the desired volume of crude mixture, is then moved into the shaping station, where the spikes 23 and the cover plate 24 are moved into the mold box 20', such as in the previously described manner, for finish-molding the blank.

In lieu of, or in addition to, the previously described indirect heating of the crude mixture in the mold 20, the latter may be heated by a high frequency field, whereby the conveyor belt 80 and the cover plate 24 serve as condensor plates.

The molding box 20' is connected with a carriage 82, by which the molding box 20' may be moved back and forth between the filling station and the shaping station, by means of a piston-cylinder unit 83 which engages the carriage 82.

Whenever the molded blank 26 has reached a sufficient strength, the molding box 20' is lifted (say by means of a piston-cylinder unit and guided on vertical bars, not shown) after which the spikes 23 and the cover plate 24 are removed. The blank 26 removed from teh mold in such manner is conveyed further by the conveying belt 80 in order to be taken over at the end of the conveyor belt 80 by a stacking device 84, which is for example, equipped with grippers 85.

Effectively, the conveyor belt is sprayed with a separate agent by way of a nozzle 86 before the filling station. A corresponding spraying device 87 is provided for the mold box 20'. Instead of that however, it may also be possible to immerse the molding box 20' and the spikes 23 in a bath of a separating agent energized preferably ultrasonically, so that adhering remnants may be removed from the crude mixture.

For this a cleaning apparatus (not shown) in the form of a stripping roller, of a scraper, etc., may be provided at the delivery end of the conveyor belt 80.

The method of operation of the apparatus shown in FIG. 12 is suited particularly for shortening the heating process in order to achieve the desired stability of the blank 26 in such a way, that the latter will be removed from the mold, whenever it has such strength, that it might be transported without trouble by means of the conveyor belt 80, but may not yet be grasped by the stacking mechanism 84, since its strength is not yet sufficient for handling. TNe futher strengthening of the blank 26 up to the required strength of the blank takes place then by reheating, possible conduction of the conveyor belt 80, transporting the blanks 26 underneath a reheating arrangement 88 with for example, infrared radiators or through a heating tunnel, etc.

The process and the apparatus of the invention make it possible to produce light-weight stones with almost optimal characteristics in an extraordinarily quick and therefore economical manner. Light-weight stones which because of their low bulk density and their perforations have outstanding heat damping characteristics, and may be handled relatively easily and simply despite their large size so taht a correspondingly increased building performance may be achieved.

The production of stones according to the invention will now be explained on the basis of the following examples. According to these examples, 10-DF-stones, i.e., stones having dimensions of 428 mm×300 mm (basic surface)×238 mm (height) were produced which had a proportion of holes of about 41%. The individual components in this case were made available by weight and the adding of foam was adjusted by preselection of the foaming time of a foam gun. The dry components were put in a mixer and the adding-in of water began after its start. After 35 seconds of mixing time, foam was added. At the end of a foaming time of 8 seconds, an additional re- and intermixing of the foam took place for 25 seconds. At the end of the total mixing time of 60 seconds, the adding of the crude mixture into a mold took place, which together with its spikes was heated. After a certain molding time in the mold, the blank was removed from the mold and transported to an autoclave, where it was subjected to steam-hardening (in case of saturated steam for 5 hours at 15 bar; 1 hour heating at an increasing pressure of from 0 to 15 bar, 5 hours at a constant 15 bar and 198° C., then 1 hour cooling at 0 bar).

EXAMPLE 1

A crude mixture of the following components was produced:
10 kg quartz sand (washed natural sand) having a grand size between 0 and 4 mm, mean grain size 0.6 to 1 mm;
5 kg of quartz powder, grain size <0.16 mm;
2.2 kg of water;
1.5 kg of calcium hydroxide (according to DIN 1060);
2.5 kg cement. (Heidelberg quick-cement-made at Heidelberg Portland cement plant AG Leimen, Federal Republic of Germany);
600 g foam (sulfated fatty alcohol made by Chemische Fabrik Gruenau GmbH, Illertissen, Federal Republic of Germany) corresponding to a foam running time of 8.5 seconds and a foam bulk density of about 80 g/cm$^3$.

The resulting crude mixture had a temperature of 15° C. and was filled into a mold, the box of which was heated to a temperature of 75° C. and the spikes of which were heated to a temperature on top of 76° C. and on the bottom of 82° C. Prior to shaping, the mold and the spikes were treated with a release agent. After a molding time of 80 seconds, the stove blank was removed from the mold. The degree of excess filling of the mold amounted to 12%.

The crude mixture had a bulk density of 1150 kg/m$^3$, the blank had a fragment bulk density of 1285 kg/m$^3$ and a blank strength of more than 0.12 m.kg/sec$^2$/mm$^2$.

EXAMPLE 2

A crude mixture was produced from the following components;
10 kg sand, as in Example 1;
5 kg boiler slag, crushed to a grain size of 0 to 4 mm;
2.3 kg of water;
1.5 kg calcium hydroxide;
2.25 kg cement, as in Example 1;
500 g foam, as in Example 1.

The resulting crude mixture had a temperature of 20° C. and was filled into a mold, the box of which had a temperature of 78° C. and the spikes of which have a temperature on top of 77° C. and on the bottom of 83° C. After a molding time of 70 seconds, it was removed from the mold. The degree of excess filling of the mold amounted to 15%.

The crude mixture had a bulk density of 1250 kg/m$^3$, the blank had a fragment bulk density of 1375 kg/m$^3$ and a blank strength of more than 0.12 m.kg/sec$^2$/mm$^2$ and the finished stone had a fragment density of 1240 kg/m$^3$, a total density of 735 kg/m$^3$ and a strength of 5 m.kg/sec$^2$/mm$^2$.

EXAMPLE 3

A crude mixture was produced from the following components:
12 kg sand, as in Example 1;
3 kg fly ash with a grain size of 0 to 4 mm;
2.8 kg water;
1.5 kg calcium hydroxide;
2.25 kg cement, as in Example 1;
420 g foam, as in Example 1, The resulting crude mixture had a temperature of 20° C. and was filled into a mold, which was heated as in Example 2. After a molding time of 60 seconds, it was removed from the mold. The degree of excess filling amounted to 7%.

The crude mixture had a bulk density of 1490 kg/m$^3$, the blank had a fragment bulk density of 1595 kg/m$^3$ and a blank strength of more than 0.12 m.kg/sec$^2$/mm$^2$ and the finished stone had a fragment bulk density of 1435 kg/m$^3$, a total density of 855 kg/m$^3$ and a strength of 5 m.kg/sec$^2$/mm$^2$.

What is claimed is:

1. An apparatus for the production of calcium silicate based stone blanks, comprising
    means for preparing a pourable crude mixture from granulated silicate-containing material, lime, water, a cement and foam;
    means for pouring said crude mixture into at least one mold;
    said mold comprising a cover, a bottom and side plates, at least one of said plates being movable to open and close said mold;
    heating means for heating said crude mixture in said mold essentially uniformly to a temperature between 45° C. and 90° C. until achieving the desired blank-strength by strength-forming reactions of the cement in said crude mixture;
    said heating means being a high frequency voltage heating using two parts of said mold as condensor plates being connectable with a high frequency voltage source; and
    means for removing the formed stone blanks from the mold and for transferring them to a transport station.

2. An apparatus as claimed in claim 1, wherein the bottom and the cover plates are the condensor plates of the heating means.

3. An apparatus as claimed in claim 1, wherein a plurality of spaced apart mold spikes for developing holes in the stone blanks are provided, said spikes and two plates of the mold being used as condensor plates with alternating polarity.

4. An apparatus as claimed in claim 1, wherein said mold is heatable.

5. An apparatus as claimed in claim 1, wherein a plurality of spaced apart mold spikes for developing holes in the stone blanks are provided, said spikes being provided with means for individually and variably heating the spikes over the length thereof with an adjustable temperature gradient.

6. An apparatus as claimed in claim 4, wherein a plurality of spaced apart mold spikes for developing holes in the stone blanks are provided, said spikes being provided with means for individually and variably heating the spikes over the length thereof with an adjustable temperature gradient.

* * * * *